No. 716,872. Patented Dec. 30, 1902.
B. DEDMAN.
DEVICE FOR ADJUSTABLY UNITING THE RIMS AND SPOKES OF PULLEYS, WHEELS, &c.
(Application filed Sept. 2, 1902.)
(No Model.)
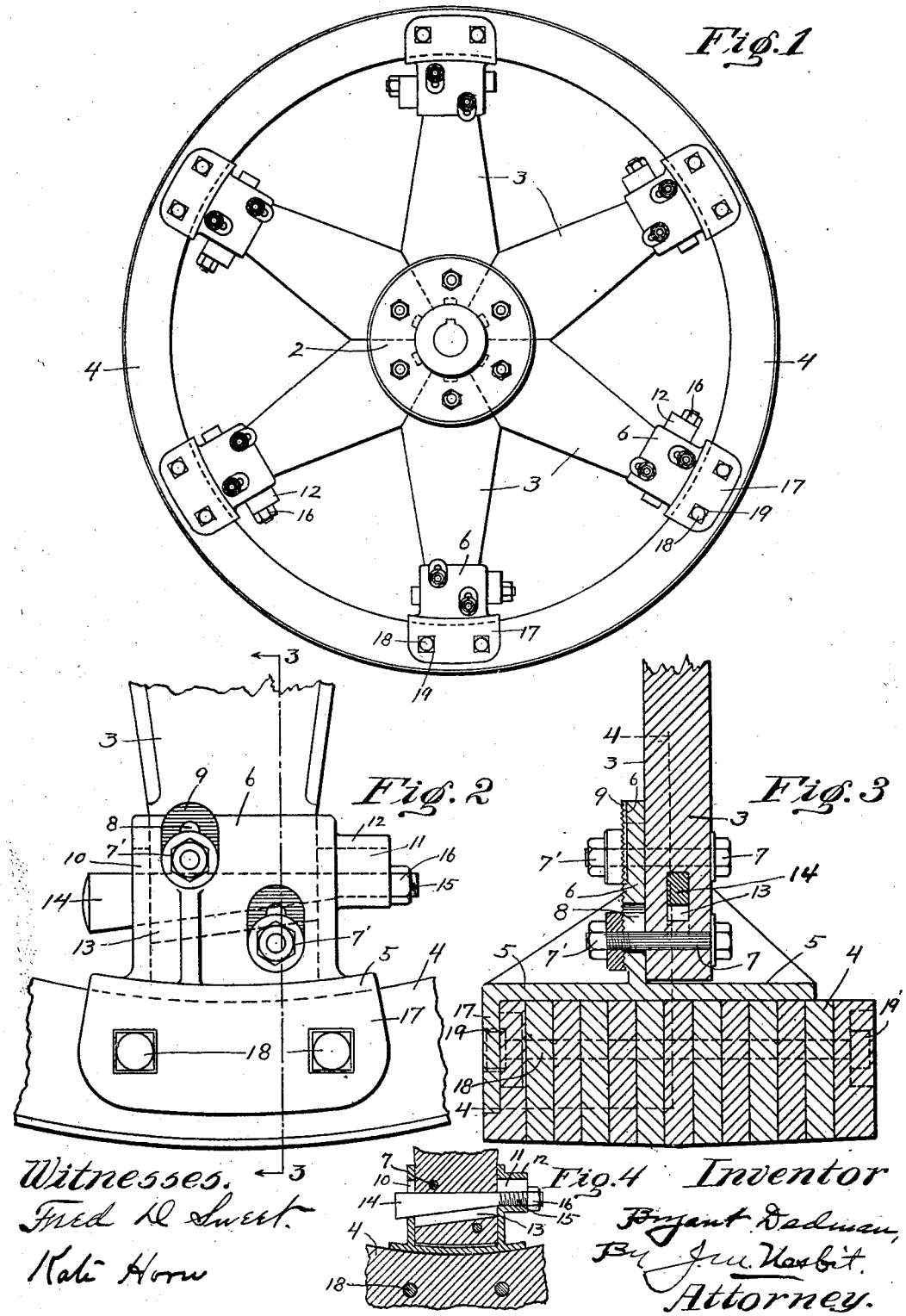

UNITED STATES PATENT OFFICE.

BRYANT DEDMAN, OF MARIETTA, OHIO, ASSIGNOR TO LEONARD D. SHRYOCK, OF MARIETTA, OHIO.

DEVICE FOR ADJUSTABLY UNITING THE RIMS AND SPOKES OF PULLEYS, WHEELS, &c.

SPECIFICATION forming part of Letters Patent No. 716,872, dated December 30, 1902.

Application filed September 2, 1902. Serial No. 121,813. (No model.)

*To all whom it may concern:*

Be it known that I, BRYANT DEDMAN, a citizen of the United States, residing at Marietta, in the county of Washington and State of Ohio, have invented certain new and useful Improvements in Devices for Adjustably Uniting the Rims and Spokes of Pulleys, Wheels, &c., of which the following is a specification, reference being had therein to the accompanying drawings.

This invention relates to built-up band-wheels, pulley, and other rotating bodies, and has particular reference to improved means for adjustably uniting the spokes and rim, whereby a new rim may be readily substituted for a worn one and quickly and accurately trued.

In the accompanying drawings, Figure 1 is a side elevation of a wheel provided with my improved securing devices. Fig. 2 is a side view, enlarged, of the securing device. Fig. 3 is a sectional view on line 3 3 of Fig. 2. Fig. 4 is a similar view, reduced, on line 4 4 of Fig. 3.

Referring to the drawings, 2 designates the hub, 3 the spokes, and 4 the rim, of usual or any preferred construction. Wood spokes and rims are usual in this class of wheels, and a sectional rim of this character is here shown, which is, however, merely one adaptation of the invention.

The securing device consists of the integral base 5 and spoke-embracing holder or socket 6, the latter being open on one side and removably confining the spoke extremity, which is secured therein by bolts 7, extending through the spoke and slots 8 in the side of the socket, said slots being formed through serrated bosses 9 on the exterior of the socket, which are impinged by nuts 7', forming a positive and secure hold for the bolts.

The edge faces of the socket are slotted at 10 and 11, respectively, slot 11 extending through boss 12, and with the spoke slotted at 13 a way is provided for key or wedge 14, formed with threaded extremity 15 to receive adjusting-nut 16.

In the adaptation here shown a flange 17 is projected at right angles from base 5, which embraces one side or edge of rim 4 with bolts 18, extending through and clamping together the rim and flange, said parts being preferably so constructed as to confine the bolt extremities entirely within the edge faces of the rim, as shown at 19 19', so that there are no projections to catch operator's clothing or do other injury.

In operation the parts of the wheel are assembled with the spoke-securing devices permanently fixed to the rim, but with bolts 7 sufficiently loose to permit wedges 14 to be adjusted for the purpose of truing the wheel, the effect of such adjustment by means of nuts 16 being obvious. After the rim has been trued, which may by this means be accomplished quickly and with great accuracy, bolts 7 are tightened, thereby firmly securing the spokes and positively maintaining the adjustment. If from any cause the rim should get out of true, the defect may be readily remedied without dismounting the wheel or pulley.

While the invention is designed, primarily, for band-wheels, particularly those used on well-drilling machinery, its use is not thus restricted, as it may be applied with equal advantage to other forms of wheels and pulleys without departing from the spirit of the invention.

Having thus fully described my invention, what I claim as new, and desire to secure by Letters Patent, is—

1. The combination of a rim, spokes, devices for adjusting the spokes with relation to the rim, and adjustable means independent of said adjusting devices for rigidly uniting the adjusted spokes and rim, substantially as described.

2. The combination of a rim, spokes, spoke-securing devices formed each with a transverse keyway, keys operative in said ways for longitudinally adjusting the spokes, and adjustable means for rigidly uniting the adjusted spokes and securing devices, substantially as described.

3. The combination of a rim, slotted spokes sockets thereon, slotted spokes, and wedging-keys operative in the slots of the sockets and spokes for adjusting the latter, each of said keys having a threaded extremity, and nuts operative on the threaded extremities for adjusting the keys, substantially as described.

4. The combination of a rim, spokes, rim-engaging spoke-securing devices formed each with a transverse keyway, wedging-keys operative in said ways for longitudinally adjusting the spokes, and spoke-securing bolts adjustable in each of the securing devices, substantially as described.

5. The combination of a rim, spokes, rim-engaging spoke-sockets adapted to embrace the spokes and formed each with a transverse keyway, wedging-keys operative in said ways for longitudinally adjusting the spokes, the sockets being slotted longitudinally, and spoke-securing bolts adjustable in said socket-slots, substantially as described.

6. The combination of a rim, slotted spokes, rim-engaging spoke-sockets each open on one side to receive a spoke and each formed with a transverse keyway, wedging-keys operative in said ways and through the spoke-slots for longitudinally adjusting the spokes, each socket being formed with longitudinal bolt-slots, and securing-bolts carried by each spoke and adjustably secured in said socket-slots, substantially as described.

7. The combination of a rim, spokes, spoke-securing means intermediate and uniting the rim and spokes, each of the spoke-securing means consisting of a base adapted to engage the inner side of the rim, a flange projecting from the base over one edge of the rim, and a spoke-holding socket projecting inward from the base, substantially as described.

In testimony whereof I affix my signature in presence of two witnesses.

BRYANT DEDMAN.

Witnesses:
 W. E. SYKES,
 PEARL MASON.